US011251695B2

(12) United States Patent
Lambert et al.

(10) Patent No.: US 11,251,695 B2
(45) Date of Patent: Feb. 15, 2022

(54) SYSTEMS AND METHODS FOR DISTRIBUTING POWER IN A POWER-TO-THE-EDGE SYSTEM ARCHITECTURE (71) Applicant: CommScope Technologies LLC, Hickory, NC (US)

(72) Inventors: David Thomas Lambert, Manchester (GB); Lee Holloway, Formby (GB); Andrew Williams, Conwy (GB); David Thomas, Chester (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/642,406

(22) PCT Filed: Sep. 7, 2018

(86) PCT No.: PCT/US2018/049862
§ 371 (c)(1),
(2) Date: Feb. 27, 2020

(87) PCT Pub. No.: WO2019/051170
PCT Pub. Date: Mar. 14, 2019

(65) Prior Publication Data
US 2020/0228001 A1 Jul. 16, 2020

Related U.S. Application Data (60) Provisional application No. 62/556,029, filed on Sep. 8, 2017.

(51) Int. Cl.
*H02M 1/32* (2007.01)
*G06F 1/26* (2006.01)
(Continued)

(52) U.S. Cl.
CPC ............... *H02M 1/32* (2013.01); *G06F 1/26* (2013.01); *H02M 3/156* (2013.01); *H04L 12/10* (2013.01); *H02M 1/008* (2021.05)

(58) Field of Classification Search
CPC ........ H02M 1/32; H02M 3/156; H02M 1/008; G06F 1/26; H04L 12/10
See application file for complete search history.

(56) References Cited

U.S. PATENT DOCUMENTS 9,377,794 B1 6/2016 Dwelley et al.
2005/0044431 A1 2/2005 Lang et al.
(Continued)

OTHER PUBLICATIONS

International Searching Authority, "International Search Report and Written Opinion from PCT Application No. PCT/US2018/049862", dated Dec. 12, 2018, pp. 1-11, Published: WO.
(Continued)

*Primary Examiner* — Nguyen Tran
*Assistant Examiner* — Trinh Q Dang
(74) *Attorney, Agent, or Firm* — Fogg & Powers LLC (57) ABSTRACT Systems and methods for distributing power in a power-to-the-edge system architecture are provided. In one embodiment, a system comprises an intelligent power switch configured to couple to a power supply, wherein the intelligent power switch outputs a first differential voltage output; and a plurality of intelligent remote nodes each comprising a management microcontroller (MCU) and a DC-to-DC converter. The intelligent remote nodes each receive the differential voltage output, and are communicatively coupled to a data network. The intelligent power switch comprises a processor executing an intelligent start-up control and switching function and an electrical fault detection function. The intelligent power switch outputs the differential voltage at a first voltage level while the electrical fault detection function monitors the differential voltage output. Based on
(Continued)

results of monitoring at the first voltage level, the intelligent power switch switches the output to a second voltage level higher than the first voltage level.

38 Claims, 7 Drawing Sheets

(51) Int. Cl.
   *H02M 3/156*   (2006.01)
   *H04L 12/10*   (2006.01)
   *H02M 1/00*    (2006.01)

(56) References Cited

U.S. PATENT DOCUMENTS

| | | |
|---|---|---|
| 2005/0136989 A1 | 6/2005 | Dove |
| 2011/0006607 A1 | 1/2011 | Kwon et al. |
| 2011/0310519 A1* | 12/2011 | Baba .................. H04N 5/63 361/91.1 |
| 2012/0206064 A1 | 8/2012 | Archenhold |
| 2013/0173939 A1 | 7/2013 | Peto |
| 2014/0258742 A1 | 9/2014 | Chien et al. |
| 2017/0288556 A1* | 10/2017 | Tang ................ H02M 3/33592 |

OTHER PUBLICATIONS

European Patent Office, "Extended European Search Report from EP Application No. 18853487.9", from Foreign Counterpart to U.S. Appl. No. 16/642,406, dated May 10, 2021, pp. 1 through 8, Published: EP.

* cited by examiner

SYSTEMS AND METHODS FOR DISTRIBUTING POWER IN A POWER-TO-THE-EDGE SYSTEM ARCHITECTURE

CROSS-REFERENCE TO RELATED APPLICATION

This application is a 371 U.S. National Stage Patent Application of PCT Application No. PCT/US2018/049862, titled "SYSTEMS AND METHODS FOR DISTRIBUTING POWER IN A POWER-TO-THE-EDGE SYSTEM ARCHITECTURE", filed on Sep. 7, 2018, which claims priority to, and the benefit of, U.S. Provisional Patent Application No. 62/556,029, titled "SYSTEMS AND METHODS FOR DISTRIBUTING POWER IN A POWER-TO-THE-EDGE SYSTEM ARCHITECTURE" filed on Sep. 8, 2017, each of which are incorporated herein by reference in their entirety.

BACKGROUND

An increasing number of devices connected to data networks are located in areas that lack access to readily accessible sources of electricity to provide power to the devices. Hybrid cables that can deliver both data connectivity and electric power have emerged as one solution to this problem. However, the increasing number of devices in use, for applications such as providing wireless access points, or security cameras and sensors for example, and the expected increasing density of devices in some locations needed to support emerging telecommunications technologies, such as 5G wireless, will increase the power demands on hybrid cables beyond what existing standards, such as Power-over-Ethernet (PoE) can support.

For the reasons stated above and for other reasons stated below which will become apparent to those skilled in the art upon reading and understanding the specification, there is a need in the art for systems and methods for distributing power in a Power-to-the-Edge system architecture.

SUMMARY

Embodiments of the present disclosure include systems and methods for distributing power in a Power-to-the-Edge system architecture and will be understood by reading and studying the following specification.

In one embodiment, a high voltage distributing data access system comprises: an intelligent power switch configured to couple to a power supply, wherein the intelligent power switch outputs a first differential voltage output; a plurality of intelligent remote nodes each comprising a management microcontroller (MCU) and an DC-to-DC converter; wherein the plurality of intelligent remote nodes each receive the differential voltage output, and are communicatively coupled to a data network; wherein the intelligent power switch comprises a processor executing an intelligent start-up control and switching function and an electrical fault detection function; and wherein upon initialization, the intelligent start-up control and switching function configures the intelligent power switch to output the differential voltage output at a first voltage level while the electrical fault detection function monitors the differential voltage output; wherein based on results of monitoring of the differential voltage output at the first voltage level, the intelligent start-up control and switching function configures the intelligent power switch to switch the differential voltage output to a second voltage level higher than the first voltage level; wherein while the intelligent power switch outputs the differential voltage output at the first voltage level, the MCU executes a low voltage startup procedure; wherein based on the results of the low voltage startup procedure, the MCU executes a high voltage startup procedure after the intelligent power switch switches output of the differential voltage output to the second voltage level; wherein based on the results of the high voltage startup procedure, the MCU configures the DC-to-DC converter to output a second differential voltage output.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide various embodiments for a point-to-multipoint power distributing data access system which provides high power voltage from a high voltage power source to remote nodes to facilitate the distribution of power and data connectivity via cable drops to remote powered devices. More specifically, an intelligent power switch (IPS) works in conjunction with a system of intelligent remote nodes to distribute high voltage power through the intelligent remote nodes. The intelligent remote nodes may be coupled to each other in a daisy chain or similar configuration so that power received at one intelligent remote node may be passed through to the next intelligent remote node in the chain. The initial system power-up procedure involves two distinct operating modes: a low voltage mode and a high voltage mode. The intelligent power switch initially provides a low voltage differential DC power signal to the intelligent remote nodes, which may be a ground isolated DC power signal. In some embodiments, this low voltage power signal will be gradually ramped up to the desired voltage level. Upon receiving the low voltage power signal, each of the intelligent remote nodes begin their low voltage startup procedure, performing various internal diagnostics that verify the processor and other internal electronics within the node are operating as expected. As discussed below, the intelligent remote nodes may randomly or sequentially stagger initiation of their low voltage startup procedure so as to prevent all of the nodes from starting and coming online at the same time. The intelligent power switch will monitor the current draw and/or other electrical parameters during this period of time when the intelligent remote nodes are each performing their low voltage startup procedures. If no unresolved anomalies are detected during low voltage operation, then the intelligent power switch will switch its output to high voltage. In one embodiment, the intelligent power switch may delay switching its output to high voltage based on a set duration of time that is sufficiently long for all of the intelligent remote nodes to complete their low voltage startup procedures. Alternatively, in some embodiments, the intelligent power switch may monitor the power drawn from the intelligent remote nodes to sense signature power surges that are characteristic of the intelligent remote nodes performing their low voltage startup procedures. When the intelligent power switch determines that the occurrence of these signature power surges has ceased, it may conclude that the intelligent remote nodes have completed their low voltage startup procedures, and then switch its output to high voltage. In some embodiments, the switching from low voltage output to high voltage output is be gradually ramped.

Upon receiving the high voltage power signal from the intelligent power switch, the intelligent remote nodes will each initiate a high voltage startup procedure. The intelligent remote nodes may randomly or sequentially stagger initiation of their high voltage startup procedure so as to prevent all of the nodes from drawing high voltage power at the same time. During the high voltage startup procedure, an intelligent remote node performs various internal diagnostics that verify the high voltage components of the node are operating as expected. If the intelligent remote node determines that its high voltage components are operating as expected, it may proceed to switch-in to tap power from the high voltage signal in order to power electronic components within and/or coupled to the intelligent remote node. For example, in one embodiment, after completing the high voltage startup procedure, an intelligent remote node begins delivering the high voltage power to PoE power sourcing equipment (PSE) for delivery along with data service to one or more PoE remote powered devices. Because the electric power is delivered to the intelligent remote nodes at a high voltage level (for example, greater than or equal to 60 VDC), the distance that intelligent remote nodes may be located from the intelligent power switch may be increased as compared to delivery at low voltage (for example, less than 60 VDC). Moreover, the amount of electric power available at each intelligent remote node for energizing the powered devices is also increased.

The pass-through power architecture of the embodiments described herein mitigates the consequences of component faults by isolating faults, where possible, to a specific faulted intelligent remote node. That is, if an intelligent remote node, through either its low voltage startup procedure or high voltage startup procedure detects a problem, it will not switch itself in to tap the high voltage signal delivered by the intelligent power switch when the high voltage signal becomes available. In the event that the intelligent power switch, after switching its output to high voltage, detects an electrical fault that is not cleared from the system by the actions of an intelligent remote node, the intelligent power switch may then make the determination whether to drop its output back to low voltage, or instead to disable its own output to lockout the detected fault.

It should be understood that the functions, structures and other description of elements for embodiments described herein may apply to like named or described elements in any of the other figures and vice versa. It should be understood that elements discussed with respect to different embodiments disclosed herein may be used in conjunction with, in combination with, or substituted for elements of any of the other embodiments discussed herein and vice versa.

Figure 1:
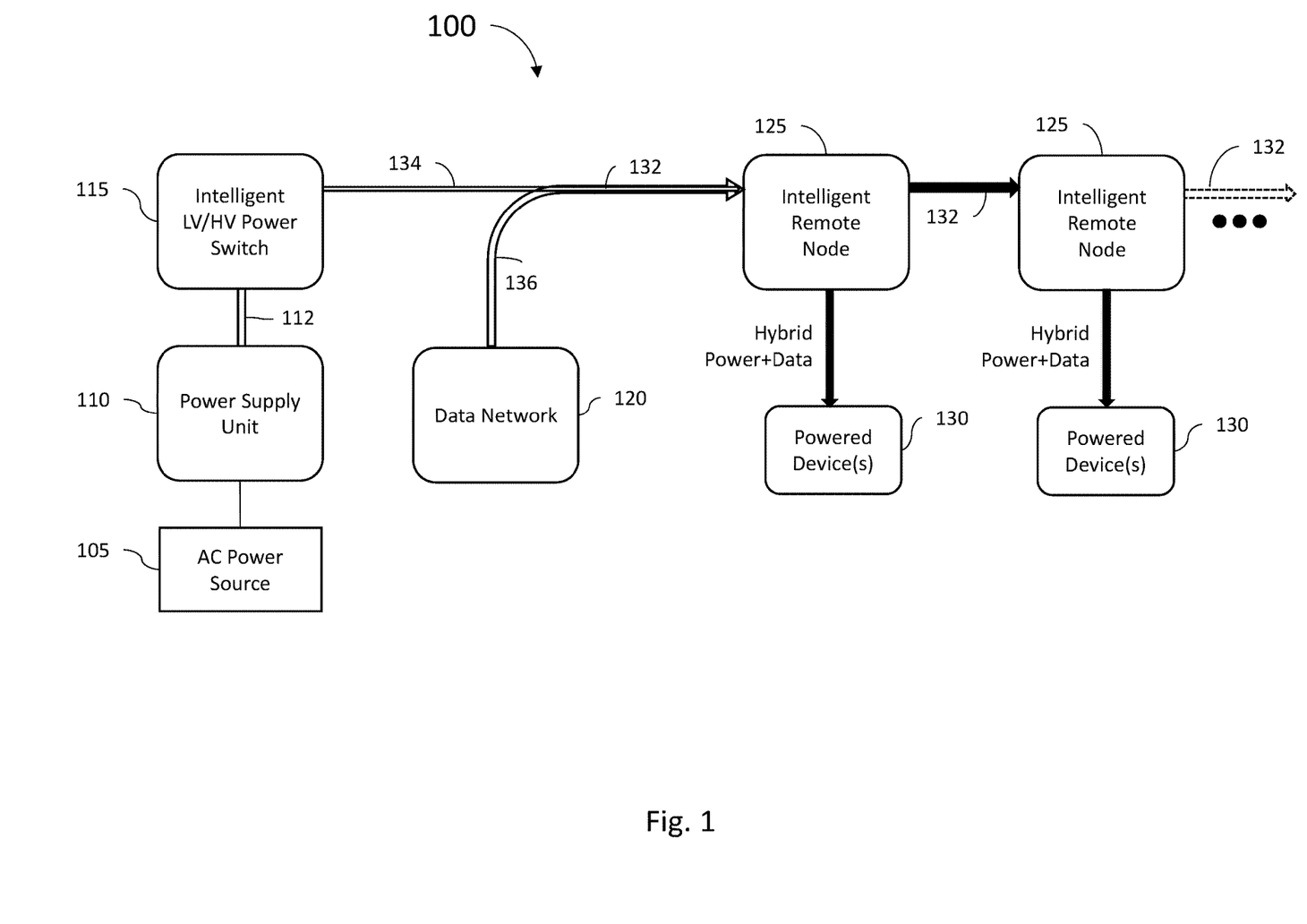
FIG. 1 is a diagram of a power distributing data access system of one embodiment of the present disclosure.

FIG. 1 is a diagram illustrating a point-to-multipoint high voltage distributing data access system 100 of one embodiment of the present disclosure. System 100 comprises a direct current (DC) power supply unit 110 (which may comprise a rack mounted AC/DC rectifier, for example) receiving power from an alternating current (AC) power source 105 (for example, a 90V to 260V AC supply circuit). It should be understood that the network topologies for which embodiments of the present disclosure apply may be varied and is not limited to any one topology. For example, the particular network topology of system 100 may be varied and include a linear tap off network, a ring architecture, a tree network and/or other combinations.

In this embodiment, the DC power supplied by the power supply unit 110 is provided across a pair of electrical conductors 112, for example, as a ground isolated differential voltage. That is, the potential difference between either of the conductors and ground potential are ideally equal while opposite in potential, and half the potential difference between the two conductors. In the embodiment shown in FIG. 1, the differential voltage output from the power supply unit 110 is 180 VDC, though in other embodiments, other voltages may be used. The output of power supply unit 110 feeds the intelligent power switch 115, which delivers power to a plurality of intelligent remote nodes 125 which are coupled to the intelligent power switch 115 in a daisy chain architecture through one or more hybrid power data cables 132. Each of the plurality of intelligent remote nodes 125 may further be coupled to one or more remote powered devices 130, which receive electric power distributed by the intelligent remote nodes 125. As shown in FIG. 1, the intelligent power switch 115 provides electric power that energizes at least one pair of electrical conductors 134 of a first hybrid power data cable 132, while at least one data communication medium 136 of the hybrid power data cable 132 is communicatively coupled to a data network 120 such as a telecommunications network. The data communication medium 136 may comprise electrical conductors for carrying electrical data signals, optical fiber for carrying optical data signals, or some combination thereof.

In some embodiments, telecommunications network 120 is a telecommunications network, for example, providing voice, data and video services to customer premise equipment (CPE) such as the remote powered devices 130. In some embodiments, the remote powered devices 130 are CPE and the intelligent remote nodes 125 provide network interface devices that define the demarcation point separating the CPE from a telecommunications service provider network. In other embodiments, the intelligent remote nodes 125 may be upstream from the demarcation point, but located at the customer premise.

It should be understood that although this disclosure primarily focuses on systems where power and data connectivity are distributed from to one or more remote powered devices 130 via intelligent remote nodes 125, some embodiments or parts thereof may provide for power delivery without data connectivity. Such power only embodiments may deliver power as described herein, but omit or otherwise not utilize elements discussed below associated strictly with data connectivity. It should be understood that the remote powered devices 130 are not limited to any particular type of device or functionality. In alternate implementations, the remote powered devices 130 may comprise devices such as, but not limited to, lighting, security cameras, sensors, displays, graphical user interface (GUI) devices, network access points, or other stationary wireless device. It should be understood that the remote powered devices 130 are also not limited to in-building applications, but may be located throughout an outside plant or facility to enable delivery of power from a central location to remote satellite locations such as for powering radio equipment, small cellular communication cites or subsystems, security sensors, cameras, LED lighting, for example.

Figure 2:
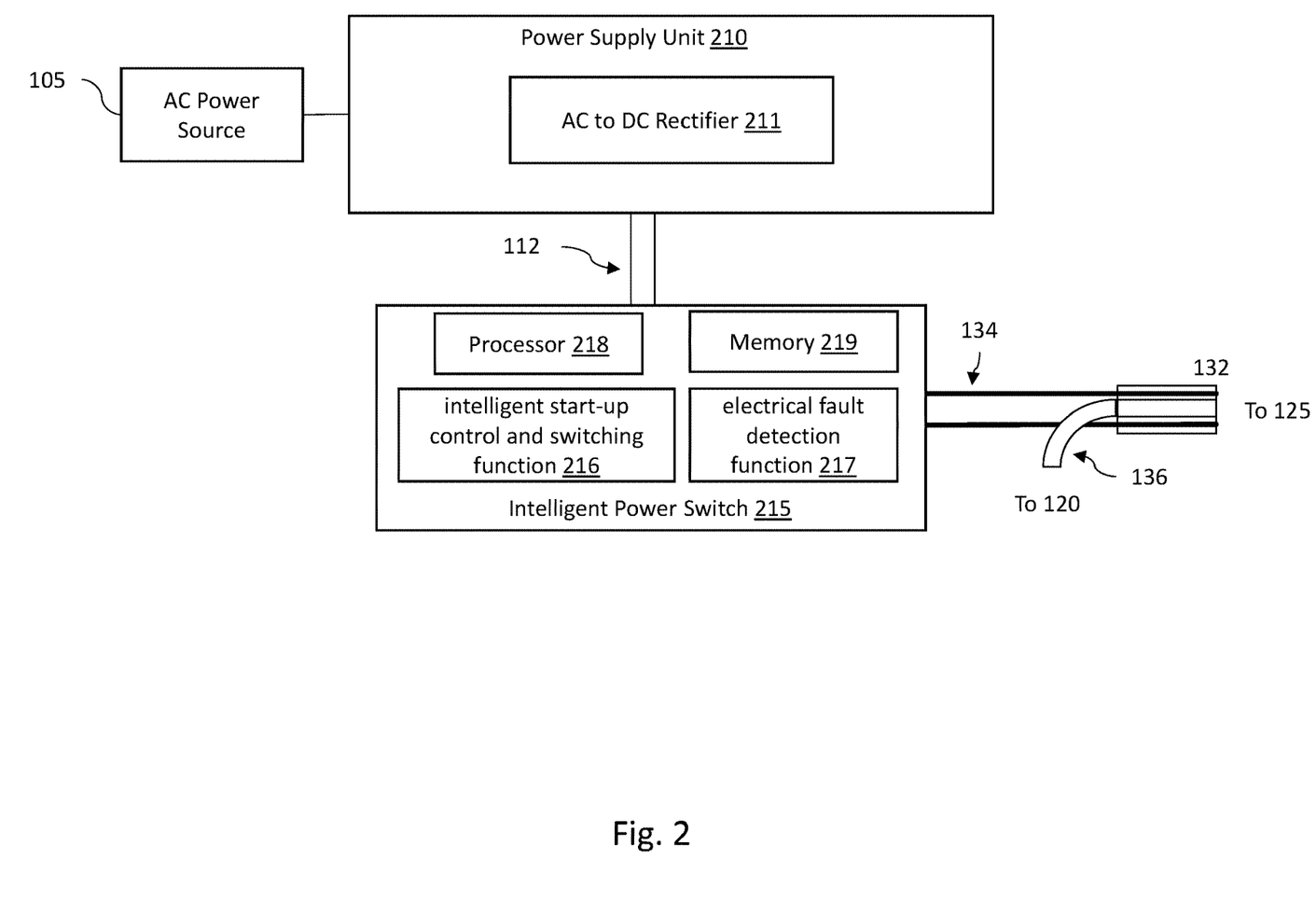
FIG. 2 is a diagram illustrating a power supply unit and intelligent power switch of one embodiment of the present disclosure.

FIG. 2 is a diagram illustrating further illustrating a power supply unit 210 and intelligent power switch 215 such as the power supply unit 110 and intelligent power switch 115 of FIG. 1. It should be understood that elements discussed with respect to FIG. 2 herein may be used in conjunction with, in combination with, or substituted for elements of any of the other Figure discussed herein and vice versa. The power supply unit 210 comprises an AC to DC rectifier 211 that converts AC power from the AC power source 105 into a high voltage differential DC voltage output. In some embodiments, AC to DC rectifier 211 may be isolated from ground. In one embodiment, one or both of the power supply unit 210 and the intelligent power switch 215 may be configured as a rack mounted power supply unit. The output from the power supply unit 210 is applied to the conductor pair 112 to feed power to the intelligent power switch 215. The DC output of the intelligent power switch 215, in turn, energizes the pair of electrical conductors 134 of the first hybrid power data cable 132 coupled to the first intelligent remote node 125.

The intelligent power switch 215 comprise an intelligent start-up control and switching function 216, and an electrical fault detection function 217. In one embodiment, the intelligent power switch 215 comprises a processor 218 coupled to a memory 219 which executes code to implement at least in part, one or both of the intelligent start-up control and switching function 216 and the electrical fault detection function 217.

As its name implies, the intelligent start-up control and switching function 216 controls the operation of the intelligent power switch 215 as it starts-up into its initial low voltage output mode, and then subsequently as it switches from low voltage output to high voltage output. The electrical fault detection function 217 comprises various components to monitor the output from the intelligent power switch 215 to detect fault constitutions of varying severity such as, but not limited to, open circuits, short circuits, overcurrent, overvoltage, voltage imbalances, and earth faults. In one embodiment the electrical fault detection function 217 may include an earth fault detection function that uses a high ohmic mid-point measurement to achieve very sensitive detection of earth faults, which may be more sensitive than other ground fault detection schemes such as ground fault interrupts (GFI) circuits.

During the low voltage startup phase, the electrical fault detection function 217 may measure parameters such as, but not limited to, the input voltage to the intelligent power switch 215, the output current from the intelligent power switch 215, the output differential voltage from the intelligent power switch 215, and the output's high ohmic midpoint voltage. During the low voltage startup phase, the intelligent remote nodes 125 perform their low voltage startup procedure. After they complete their low voltage startup procedure, but before the intelligent power switch 215 initiates the high voltage startup phase, the intelligent remote nodes 125 remain in an idle state where little current is being drawn, which enables a sensitive measurement to detect low voltage overcurrent conditions and a valid measurement of an earth fault. To avoid nuisance trips, in some embodiments, an overvoltage condition must be sustained to be considered a potential fault.

When the high voltage startup phase is switched in, parameters measured by the electrical fault detection function 217 may again include the input voltage to the intelligent power switch 215, the output current from the intelligent power switch 215, the output differential voltage from the intelligent power switch 215, and the output's high ohmic midpoint voltage. In some implementations, the electrical fault detection function 217 may also measure the voltage of internal power supplies (for example, for switching field effect transistors (FETs) to ensure the FETs will be fully on when switched into circuit) preventing overheating faults.

During the high voltage startup phase, the intelligent remote nodes 125 complete their high voltage startup. After the high voltage startup is completed, but before loads from remote powered devices are added, there is a lull in which little current is drawn by the nodes. This lull in current draw enables a sensitive measurement of high voltage overcurrent prior to the intelligent remote nodes 125 fully coming online with their remote powered device 130 being switched in. Once the loads have been switched in, the intelligent power switch 215 will primarily rely on sensing gross overcurrent conditions to detect anomalies.

To deal with gross overcurrent events, the intelligent power switch 215 may include an independent overcurrent detection (i.e. not processor controlled) which will automatically turn off the high voltage in the event of such a fault. In one embodiment, the independent overcurrent detection may comprise an autonomous circuit breaker that operates to cut off the high voltage output to intelligent remote nodes 125.

Because the intelligent power switch 215 can monitor its output current continuously, the electrical fault detection function 217 can also be configured to detect unexpected changes in current compared to a startup baseline (which may be stored in a memory). Monitoring the input and output voltages can also include checking the voltage drop across the high voltage switching components (e.g., FETs or other power electronics) to detect potential faults. As in the low voltage case, during the high voltage startup phase the electrical fault detection function 217 can also detect earth faults with a high degree of sensitivity.

Figure 2A:
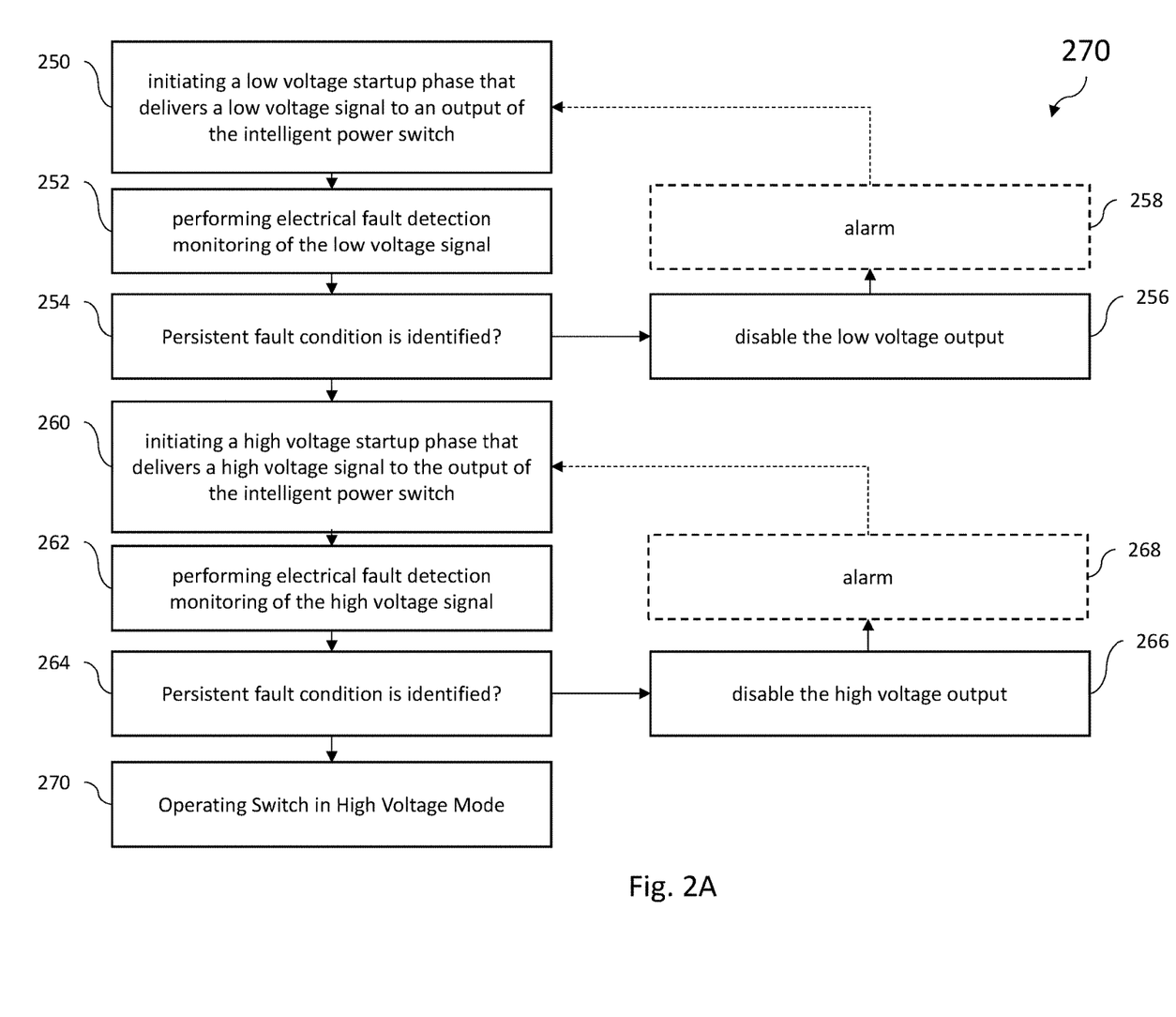
FIG. 2A is a flow chart illustrating a method for an intelligent power switch of one embodiment of the present disclosure.

FIG. 2A is a flow chart illustrating a system initialization method 270 performed by the intelligent power switch 215 for one embodiment of the present invention. It should be understood that elements discussed with respect to FIG. 2A herein may be used in conjunction with, in combination with, or substituted for elements of any of the other Figure discussed herein and vice versa. In some embodiments, the method 270 is implemented by code executed by the processor 218 as part of the intelligent start-up control and switching function 216 and the electrical fault detection function 217. The method begins at 250 with initiating a low voltage startup phase that delivers a low voltage signal to an output of the intelligent power switch 215. During the low voltage startup phase, the intelligent power switch 215 ramps its output up to a first predetermined voltage level. For example, a non-zero output of less than or equal to a 60 VDC across the output terminals would be considered a low voltage output. The method proceeds to 252 with performing electrical fault detection monitoring of the low voltage signal. As discussed above the low voltage electrical fault detection monitoring can occur while one or more intelligent remote nodes perform their low voltage startup procedures, and for some duration of time after the intelligent remote nodes complete their low voltage startup procedures. If a persistent fault condition is identified (254), the intelligent power switch 215 may disable the low voltage output (256), optionally output an alarm (258) and may optionally return to 250 to re-attempt initiating the low voltage startup phase one or more times to see if the fault condition clears. If no voltage fault condition is identified, the method proceeds to 260 with initiating a high voltage startup phase that delivers a high voltage signal to the output of the intelligent power switch 215. For example, in some embodiments an output of greater than 60 VDC across the output terminals of the intelligent power switch 125 would be considered a high voltage output, while an output of less than or equal to 60 VDC across the output terminals of the intelligent power switch 125 would be considered a low voltage output.

The method proceeds to 262 with performing electrical fault detection monitoring of the high voltage signal. As discussed above the high voltage electrical fault detection monitoring can occur while one or more intelligent remote nodes perform their high voltage startup procedures, and may continue for some predetermined duration of time after the intelligent remote nodes complete their high voltage startup procedures. When the high voltage startup phase is initiated by the intelligent power switch 215, the intelligent remote nodes 125 each perform their own high voltage startup procedure so that if high voltage components within an intelligent remote node 125 are faulted or otherwise are operating anomalously, that intelligent remote node 125 can mitigate that condition by disconnecting its high voltage components. If the intelligent remote nodes 125 is unable to clear the condition such that a persistent fault condition is presented to the intelligent power switch 215 (checked at 264), the intelligent power switch 215 may disable the high voltage output (266) and optionally alarm (268) and may optionally re-attempt initiating the high voltage startup phase one or more times to see if the fault condition clears. If no voltage fault condition is identified, the method proceeds to 270 with operating the switch in high voltage mode (i.e., maintaining the high voltage output) to begin steady state operation of the intelligent remote nodes 125.

In order to avoid the occurrence of a significant loading surge on the intelligent power switch 215 when the low voltage output from the intelligent power switch 215 is initially enabled, the intelligent remote nodes 125 may each implement a randomized or sequenced delay in order to stagger initiation of their low voltage startup procedure. For the same reason, when the high voltage output is initially enabled, the intelligent remote nodes 125 may each implement a randomized or sequenced delay in order to stagger initiation of their high voltage startup procedure. While there remains a finite statistical chance that the intelligent remote nodes 125 will randomly implement the same delay, such an occurrence is unlikely and not catastrophic. By incorporating a randomized or sequenced delay into each intelligent remote nodes 125 rather than a preset fixed delay, custom configuration of each intelligent remote node 125 can be avoided. Moreover, additional intelligent remote nodes 125 may be added to the chain of nodes without the need to reconfigure any predetermined sequencing.

In some embodiments, the intelligent power switch 215, or more specifically the intelligent start-up control and switching function 216, can make determinations about how startup of the intelligent remote nodes 125 is progressing by monitoring the output current draw. For example, the amount of current drawn by multiple intelligent remote nodes 125 in low voltage operation is quite small relative the current drawn by even one intelligent remote node 125 under load. Accordingly, the intelligent power switch 215 can easily determine if the current being observed is due to a fault or due to multiple intelligent remote nodes 125 being coupled to the line.

When the high voltage output is first enabled, intelligent power switch 215 will experience a power surge at its output caused by charging of the conductors of the hybrid power data cables 132, and then another surge of power caused by each of the intelligent remote nodes 125 switching in the line side of their respective DC/DC converters. At this stage, the intelligent remote nodes 125 are not yet passing power to the remote powered devices 130. Accordingly, each of the intelligent remote nodes 125 will draw from the intelligent power switch 215 a similar power surge signature, followed by a lull in power consumption. Subsequently, as each intelligent remote nodes 125 begins switching in their respective loads, an initial surge from powering the loads occurs followed by an increase in the steady state power drawn from the intelligent remote nodes 125 that will vary as a function of the power consumed by the newly connected remote powered devices 130. By monitoring the power surge signatures that occur as each intelligent remote nodes 125 performs low voltage and high voltage startup procedures, the intelligent power switch 215 can, in some embodiments, differentiate between a normal system startup, and a startup where a fault has occurred. For example, a power surge not followed by an expected lull may indicate a short circuit or other fault within one of the intelligent remote nodes 125. Ideally, an intelligent remote node 125 should identify this condition itself, and disconnect itself from the high voltage power. However, if it does not and the high power demand is sustained at the IPS for a predetermined time, the IPS may switch back down to low voltage.

Figure 3:
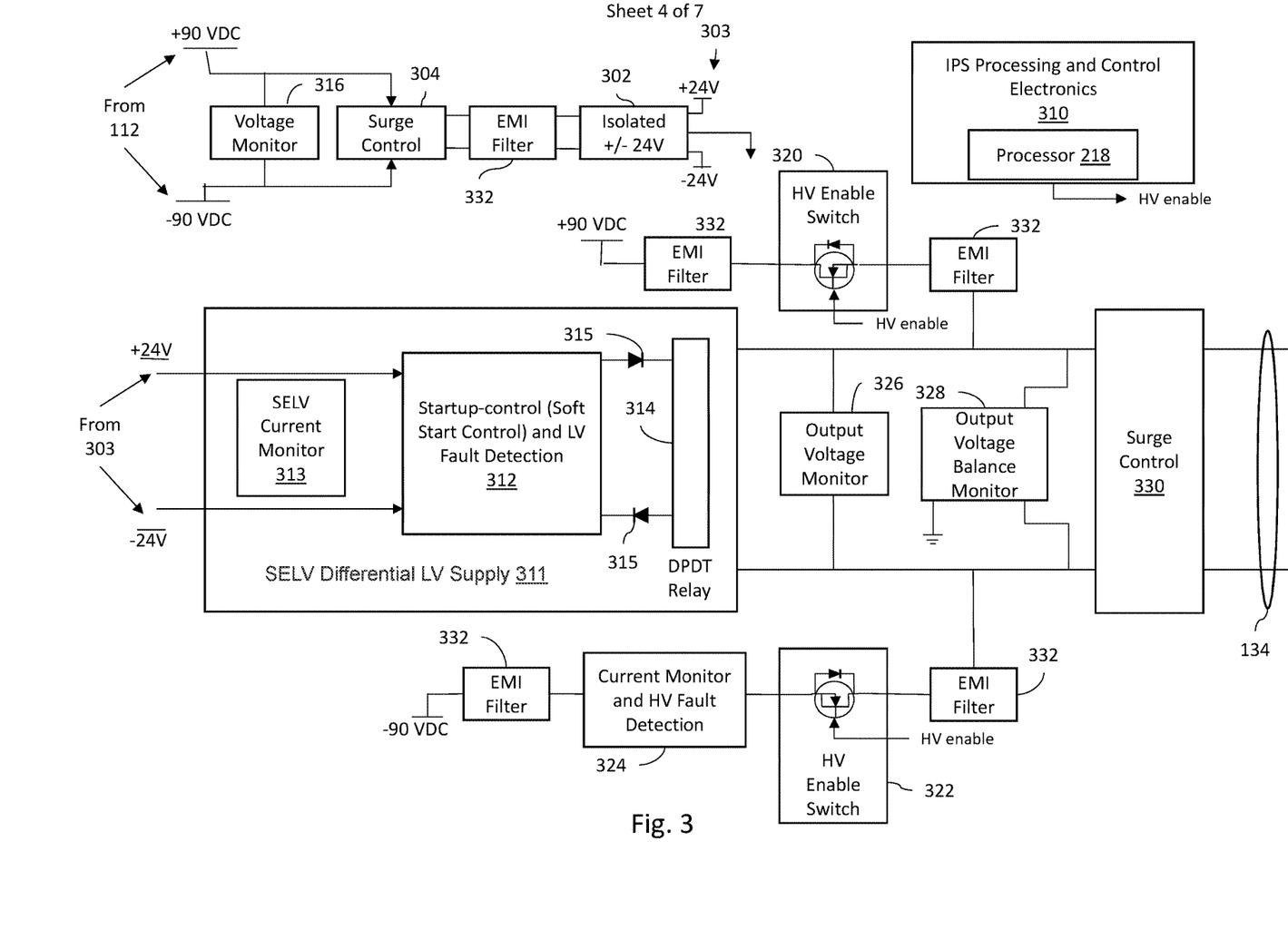
FIG. 3 is a diagram illustrating an intelligent power switch of one embodiment of the present disclosure.

FIG. 3 is a diagram illustrating elements of an intelligent power switch 300 such as the intelligent power switch 115 and intelligent power switch 215 discussed above. It should be understood that elements discussed with respect to FIG. 3 herein may be used in conjunction with, in combination with, or substituted for elements of any of the other Figure discussed herein and vice versa. In this particular implementation, the low voltage output from the intelligent power switch 215 is 48 VDC (i.e., +/−24 VDC) while the high voltage output is 180 VDC (i.e. +/−90 VDC). In other embodiments, other values of high voltage may be used such as +/−110 VDC or +/−190 VDC, for example.

In this embodiment, high voltage power is received by the intelligent power switch 300 from the power supply unit 110 via the pair of electrical conductors 112. In some embodiments, the high voltage can be a ground isolated differential voltage. The high voltage power energizes an isolated low voltage power supply 302 which provides power for the internal electronics of the intelligent power switch 300 in addition to providing the low voltage output delivered to the intelligent remote nodes 125. As shown in FIG. 3, the intelligent power switch 300 includes Processing and Control Electronics 310, which may comprise the processor 218 and memory 219 disclosed in FIG. 2, and used in conjunction with the execution of the intelligent start-up control and switching function 216 and the electrical fault detection function 217. In some embodiments, the Processing and Control Electronics 310 may include a microcontroller comprising, for example, a processor core, memory, and programmable and/or input/output peripherals. The intelligent power switch 300 may further comprise a surge control circuit 304 at the input to the intelligent power switch 300, a surge control circuit 330 at the output to the intelligent power switch 300, and one or more EMI filters 322. These elements function to prevent noise from entering the switch 300 or exiting out to the intelligent remote nodes 125, and to protect from lightning and other power surges.

Electronics coupled to the output of the isolated low voltage power supply 302 includes the Differential Low Voltage Supply circuit 311 (which may comprise a Safety Extra Low Voltage (SELV) power supply). The Differential Low Voltage Supply circuit 311 comprises a current monitor 313, a startup-control and low voltage fault detection circuit 312, and a relay 314 (which may be implemented using a double-pole double-throw (DPDT) relay) each of which may be in communication with the Processing and Control Electronics 310.

During the low voltage startup phase, relay 314 is controlled by the startup-control and low voltage fault detection circuit 312 to switch the output of the Differential Low Voltage Supply circuit 311 to conductors 134. The voltage from the output of the intelligent power switch 300 supplied to the conductors 134 may then be ramped up in a soft start by the startup-control and low voltage fault detection circuit 312. In one embodiment, the soft start performed by the startup-control and low voltage fault detection circuit 312 ramps the output voltage from zero to the desired low voltage level over a predetermined period of time, for example 400 msec. During the low voltage startup phase, the input voltage to the intelligent power switch 215 may be measured by a voltage monitor 316, the output current from the intelligent power switch 215 may be measured by the current monitor 313, the output differential voltage from the intelligent power switch 215 may be measured by an output voltage monitor 326, and the high ohmic midpoint voltage of the differential voltage from the intelligent power switch 215 may be measured by an output voltage balance monitor 328.

The various voltage monitors 316, 326, 328 and/or current monitor 313 may each provide data to the processor 218 to be used as inputs to the electrical fault detection function 217. Moreover, one or more of these inputs may be used by the processor 218 during the low voltage startup phase to monitor the power surge signatures from the intelligent remote nodes 125 as they begin to come online, as discussed above. If a short circuit or other anomaly is detected, the startup-control and low voltage fault detection circuit 312 will control the relay 314 to latch off the output from the Differential Low Voltage Supply circuit 311. Interruption of the low voltage output will notify processor 218 that there is a problem At this point the processor 218 can make the determination as to whether to try again (and if so, how many times) to see if the condition clears or remains.

Once the processor 218 has determined that operating conditions appear normal and that the intelligent remote nodes 125 are running in their low voltage modes, the processor 218 can initiate the switch from low voltage to high voltage output. As mentioned above, given the absence of any persistent detected fault, the processor 218 may in some embodiments determine when to make the switch to high voltage based on a preset time delay, or wait a preselected time after last detected power surge signature is detected. At that point, the processor 218 activates the high voltage enable switches 320 and 322, for example via a high voltage enable signal sent to those switches. As shown in FIG. 3, the first high voltage enable switch 320 is coupled to the positive potential of the high voltage power line supplied by electrical conductors 112 while the second high voltage enable switch 322 is coupled to the negative potential of the high voltage power line supplied by electrical conductors 112. When these high voltage enable switches 320 and 322 are enabled, high voltage power from the electrical conductors 112 may be applied to the electrical conductors 134 of the hybrid power data cables 132 at the output of the intelligent power switch 300. In some embodiments, the high voltage enable switch 320 and 322 each comprise high voltage field effect transistor (FET) switches that are controlled by an HV enable signal from the processor 218. When the HV enable signal from the processor 218 is not enabled, the FET switches are off so that the high voltage from the electrical conductors 112 is not applied to the output of the intelligent power switch 300. When the HV enable signal from the processor 218 is enabled, high voltage power will flow through the FET switches and is applied to the output of the intelligent power switch 300. In some embodiments, the high voltage output from the intelligent power switch 300 may be controlled to ramp up from the low voltage output level to the high voltage output level over a predetermined time duration (for example, 400 msec). In some embodiments, the differential low voltage supply circuit 311 may include blocking diodes 315 so that during high voltage operation reverse power flow into the differential low voltage supply circuit 311 is avoided.

When the high voltage startup phase is switched in, the input voltage to the intelligent power switch 300 may be measured by voltage monitor 316, output current may be measured by the current monitor 324, the output differential voltage from the intelligent power switch 215 may be measured by output voltage monitor 326, and the high ohmic midpoint voltage of the differential voltage from the intelligent power switch 215 may be measured by an output voltage balance monitor 328. The data from these monitors may again be provided to the processor 218 for use as inputs to the electrical fault detection function 217. Moreover, one or more of these inputs may be used by the processor 218 during the high voltage startup phase to monitor the power surge signatures from the intelligent remote nodes 125 as they switch to high power mode and begin to bring their individual remote powered device 130 loads online, as discussed above. Once the remote powered device 130 loads have been switched in, the intelligent power switch 300 becomes somewhat limited in its ability to detect faults other that gross overcurrent conditions. Such overcurrent or short circuit conditions may be detected by the current monitor 324 which may further comprise high voltage fail detection that includes independent overcurrent detection (i.e. not processor 218 controlled) that will automatically turn off the high voltage in the event of a fault (for example, by interrupting the HV enable signals to the HV enable switched 320 and 322). In some embodiments, the independent overcurrent detection may comprise an autonomous circuit breaker that operates to cut off the high voltage output to intelligent remote nodes 125. Moreover, the electrical fault detection function 217 during high voltage operation may implement a High Ohmic Mid-Point Earth method using measurements from voltage monitors 328 to limit touch current well below IEC 60479 perception limits (i.e. much less than 1 mA) and to allow highly sensitive detection of earth faults.

Figure 4:
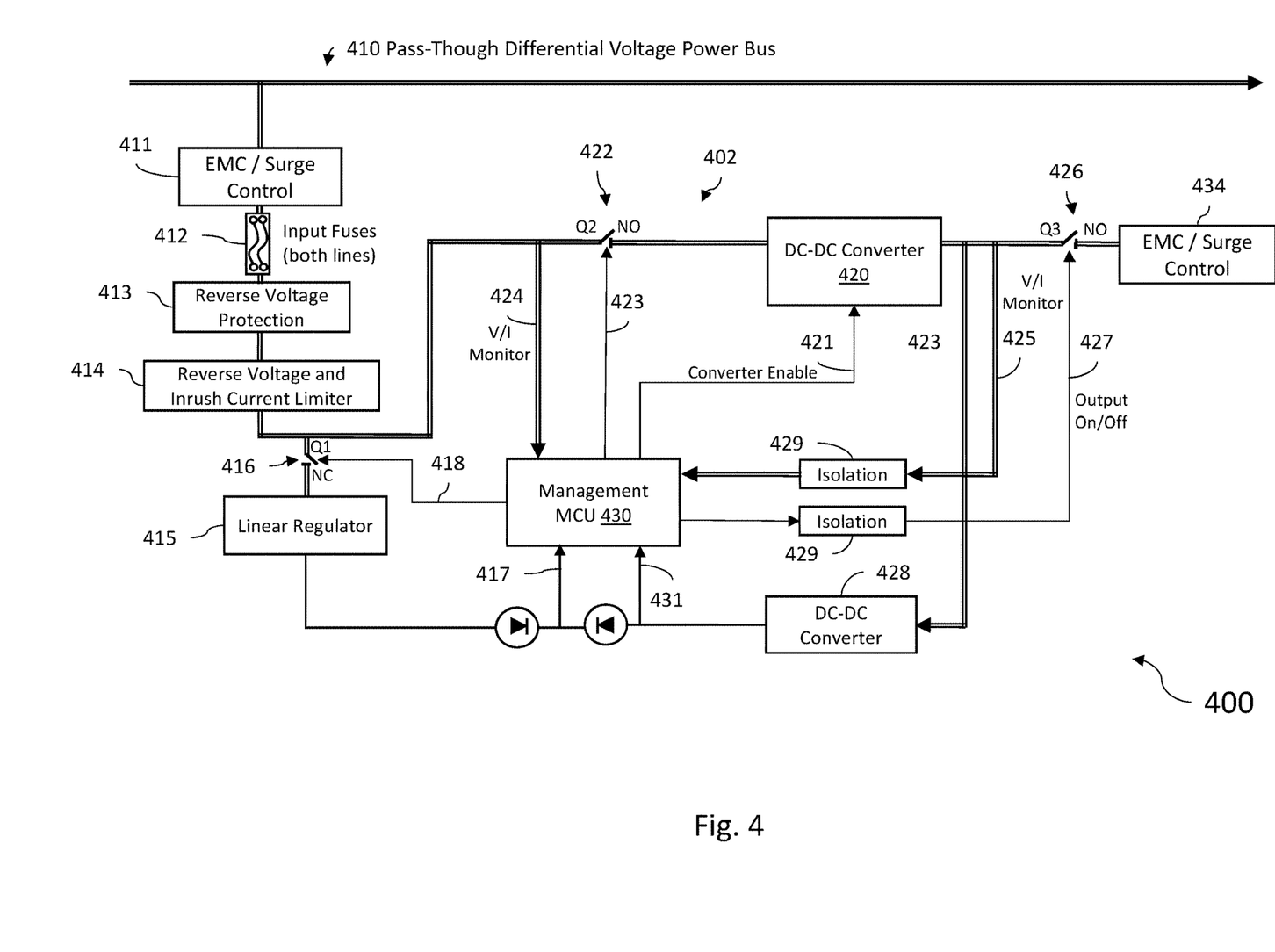
FIG. 4 is a diagram illustrating an intelligent remote node one embodiment of the present disclosure.

FIG. 4 is a diagram illustrating further illustrating elements of an intelligent remote node 400, such as the intelligent remote nodes 125 discussed above. It should be understood that elements discussed with respect to FIG. 4 herein may be used in conjunction with, in combination with, or substituted for elements of any of the other Figure discussed herein and vice versa. Each intelligent remote node 125 evaluates whether there is a fault condition present and has the capability to isolate itself from the main power bus to allow other intelligent remote nodes 125 to operate normally and prevent them from being affected.

In the embodiment shown in FIG. 4, intelligent remote node 400 comprises a power management circuit 402 that includes an DC-DC converter 420 controlled by a management microcontroller (MCU) 430. In some embodiments, although the DC-DC converter 420 may be an isolated DC-DC converter, in other embodiments it need not be isolated. In some embodiments, the DC-DC converter 420 may also include, or otherwise be implemented using, an Intermediate Bus Converter to improve efficiency. Low voltage startup of the intelligent remote node 400 is initiated by the intelligent power switch 115 when it begins to output a low voltage output to the conductors 134 of the hybrid power data cables 132. As discussed above, low voltage power may be ramped up over a short period of time, rather than immediately applied as a step change. This gradual startup feature provides the opportunity for the system to identify problems before voltages are fully applied. In the embodiment shown in FIG. 4, a voltage surge and inrush current limiter 414 may provide for this same voltage ramping feature within the intelligent remote node 400.

During system startup, the low voltage output received from the intelligent power switch 115 is received by the intelligent remote node 400 and applied to the pass-through power bus 410. One or more additional intelligent remote nodes may be coupled to the pass-through power bus 410 of the intelligent remote node 400 in a daisy-chain configuration to receive power from the intelligent power switch 115. When the low voltage power is received on the pass-through power bus 410, it is tapped-off and provided to a linear power regulator 415 that supplies power to the management MCU 430 at 417. Once the voltage level has reached a level sufficient to power the MCU 430, the MCU 430 will boot up and begin monitoring system voltage and current parameters through a monitoring line (shown at 424). If the measured parameters are within the normal operating range for low voltage operation, then the MCU 430 may conclude that the intelligent remote node 400 is safe to attempt high voltage operation once the intelligent power switch 115 switches from low voltage to high voltage output. That switch to high voltage can be detected by the MCU 430 through the monitoring of the voltage level of the power tapped from the pass-through power bus 410. When the high voltage is switched in, parameters which may be measured by the MCU 430 include input voltage and input current and output voltage and output current.

At this stage, if the measured parameters are acceptable, the MCU 430 switches the high voltage to the input of the DC-DC converter 420. The application of the high voltage to the DC-DC converter 420 is controlled by power switch 422 (Q2), which in turn is enabled by a control signal 423 from the management MCU 430. If no anomalies have been detected by the MCU 430, then the power switch 422 is operated so that power is applied to the input of the DC-DC converter 420. At this point, operation of the DC-DC converter 420 has not yet been enabled by the MCU 430 so that no output is yet being produced from the DC-DC converter 420. In this state, the MCU 430 may begin to monitor line 424 to ensure the measured voltage and current parameters are within the normal operating range for high voltage operation. If the measured parameters are within the normal operating range for high voltage operation, then the MCU 430 can send an enable signal 421 to the DC-DC converter 420 to enable output from the DC-DC converter 420. The MCU 430 then begins monitoring the voltage and current output of the DC-DC converter 420 (shown at 425) to verify that the DC-DC converter 420 is operating within specifications and not faulted. The MCU 430 may also optionally begin to bootstrap its power from the output of the DC-DC converter 420 rather than the linear power regulator 415. Doing so may be desirable given the relative efficiency of the DC-DC converter 420 over that of the linear power regulator 415. More specifically, the output of the DC-DC converter 420 is tapped (shown at 423) and used to energize a second DC-DC converter 428 (which may be an isolated DC-DC converter) configured to output an operating voltage which may be used to power the MCU 430. An input switch 416 (Q1) is located in series with the linear power regulator 415. The MCU 430 monitors the output of the second DC-DC converter 428 (shown at 431) and when it detects the desired operating voltage is present, it sends a control signal 418 to the input switch 416 to disable the linear power regulator 415 which will cause the MCU 430 to be powered at 417 from the output of the second DC-DC converter 428.

If all measured parameters remain within the normal operating range for high voltage operation, the MCU 430 may send a control signal 427 to a second power switch 426 (Q3) which will enable power to flow through the DC-DC converter 420 and energize the remote powered device 130 loads coupled to the output of the intelligent remote node 400. While running in steady state, one or more of these high voltage parameters may be continually monitored and if faults occur the output of the intelligent remote node 400 can be selectively switched off by MCU 430 by operating power switch 426. If anomalies remain, MCU 430 may elect to further isolate itself by operating power switch 422 to remove power to the DC-DC converter 420. In some embodiments, prior to opening power switch 422, MCU 430 may elect to re-enable linear power regulator 415 by enabling input switch 416 so that power to MCU 430 is not interrupted.

Also as shown in FIG. 4, management circuit 402 may further include electromagnetic interference/surge control protection at the input and output (shown at 411 and 434, respectively) as well as a reverse voltage protection circuit 413 and fuses 412 on both polarities of the differential input to the management circuit 402. Moreover, isolation circuits 429 may be provided on any measurement or control lines (for example 425 and 427) which are coupled to the output of the DC-DC converter 420 to maintain balance of the differential voltage polarities with respect to ground and protect against inadvertent grounding of one polarity or the other.

Figure 4A:
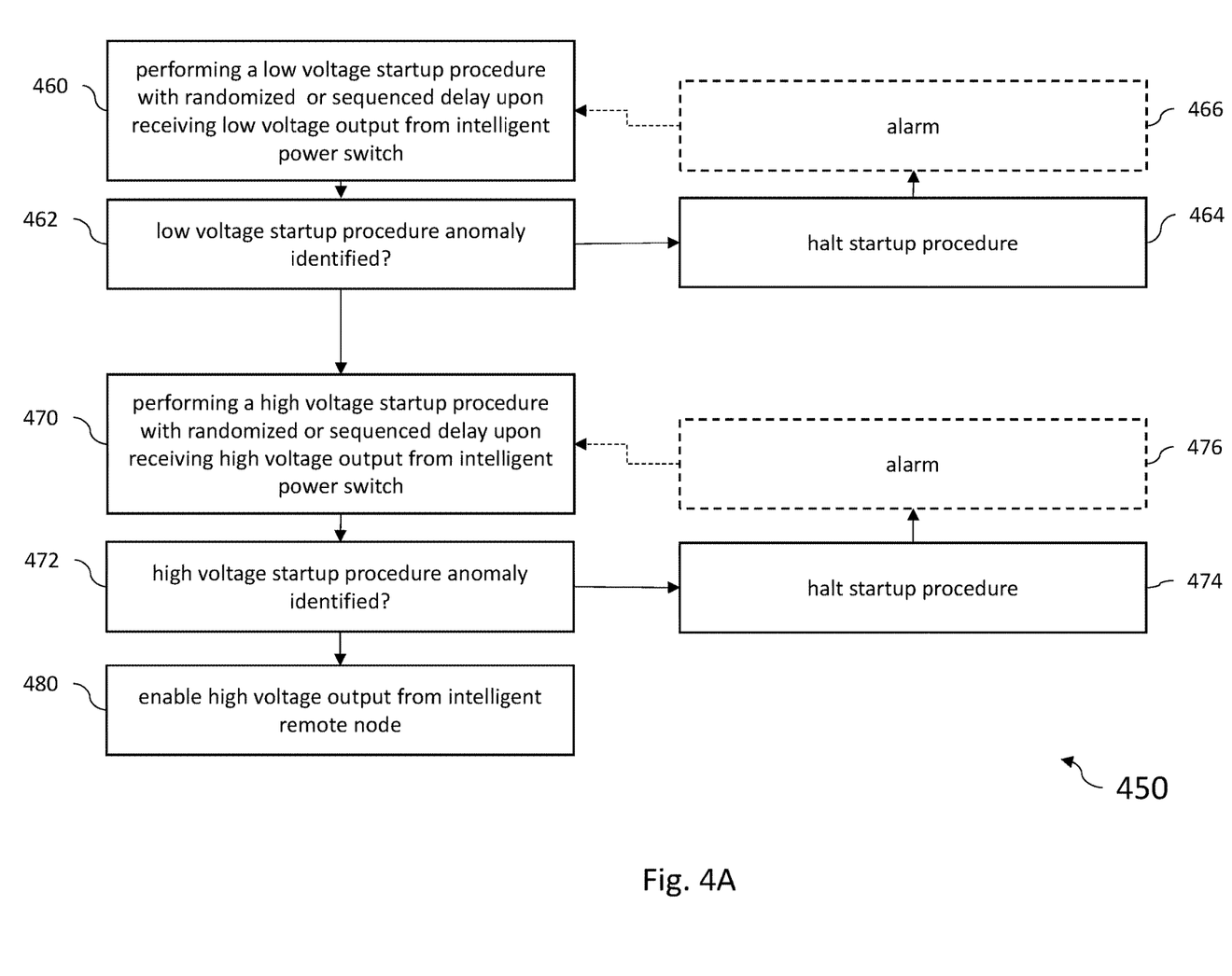
FIG. 4A is a flow chart illustrating a method for an intelligent remote node of one embodiment of the present disclosure.

FIG. 4A is a flow chart illustrating a system initialization method 450 performed by the intelligent remote node 400 for one embodiment of the present invention. It should be understood that elements discussed with respect to FIG. 4A herein may be used in conjunction with, in combination with, or substituted for elements of any of the other Figure discussed herein and vice versa. In some embodiments, the method 460 is implemented using code executed by the management MCU 430. The method 450 begins at 460 with performing a low voltage startup procedure with randomized or sequenced delay upon receiving low voltage output from an intelligent power switch. If an anomaly is identified (as determined at 462) then the method may proceed to 464 where the startup procedure is halted and optionally to 466 where an alarm is provided. In some embodiments, depending on the anomaly identified, the MCU 430 may return to 460 one or more times to attempt to successfully retry the low voltage startup procedure. For example, if the procedure was halted due to a temporary fault or other condition that has since cleared, a subsequent attempt at completing the low voltage startup procedure may be successful.

When the low voltage startup procedure is successful (i.e., no persistent anomalies identified) the method proceeds to 470 with performing a high voltage startup procedure with randomized or sequenced delay upon receiving high voltage output from the intelligent power switch. As described above with respect to FIG. 4, the high voltage startup procedure may comprise multiple stages in which different circuit segments are energized and/or enabled. For example, a first stage may measure parameters to confirm that an adequate high voltage is being received without any fault conditions within the intelligent remote node detected. In the next stage, the line side input to the DC-DC converter of the intelligent remote node may be energized, and again confirm that measured parameters indicate no fault conditions exist within the intelligent remote node. In the next stage, the output of the DC-DC converter may be enabled and parameters measured to confirm that the DC-DC converter is operating properly and again confirm that measured parameters indicate no fault conditions exist within the intelligent remote node.

If an anomaly is identified (as determined at 472) then the method may proceed to 474 where the startup procedure is halted and optionally to 476 where an alarm is provided. In some embodiments, depending on the anomaly identified, the MCU 430 may return to 470 one or more times to attempt to successfully retry the high voltage startup procedure. For example, if the procedure was halted due to a temporary fault or other condition that has since cleared, a subsequent attempt at completing the high voltage startup procedure may be successful. If the condition does not clear, then the MCU 430 may isolate the intelligent remote node as described above. When the high voltage startup procedure is successful (i.e., no persistent anomalies identified) the method proceeds to 480 with enabling high voltage output from the intelligent remote node so that remote powered devices can be energized.

It should be noted that the intelligent power switch 115 is not in direct communication with any one of the intelligent remote nodes 125 so that if any of the individual intelligent remote nodes 125 makes the determination not to tap the high voltage power to power its remote powered loads 130, the intelligent power switch 115 will not have the ability to determine which of the intelligent remote nodes 125 have done so. However, because the remote powered devices 130 of a successfully initialized intelligent remote node 125 will be energized and at least some able to communicate with the data network 120, the absence of communication from one of the those remote powered devices 130 may be used as a proxy to indicate when there is a problem affecting a certain one of the intelligent remote nodes 125.

Figure 5A:
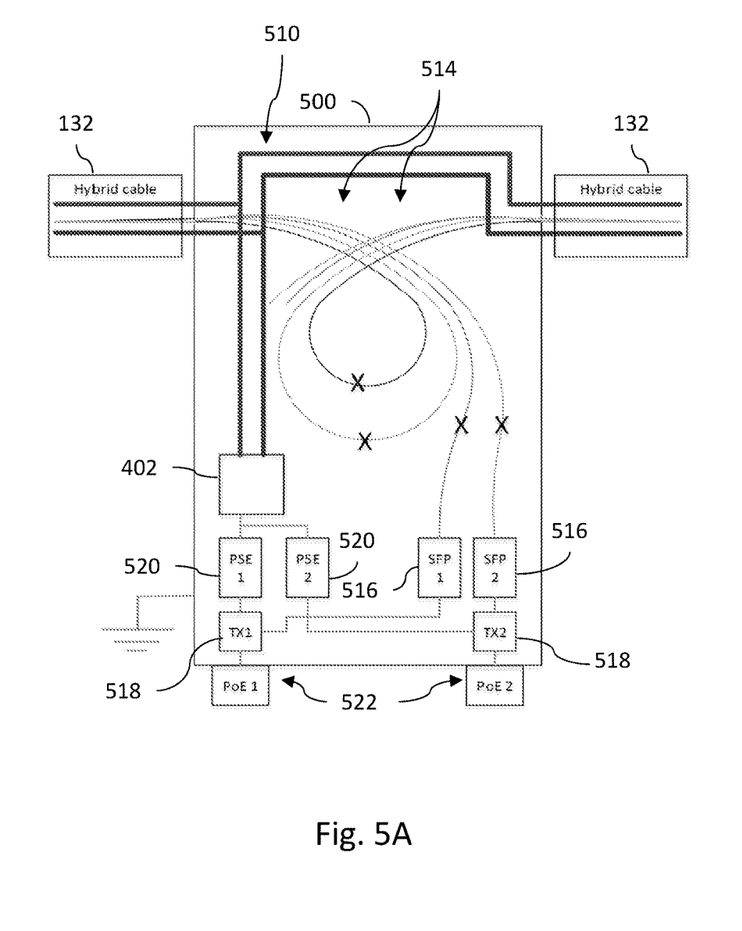
FIGS. 5A and 5B are connection diagrams for alternate intelligent remote node embodiments of the present disclosure.

FIG. 5A is a diagram illustrating internal connections for one embodiment of an intelligent remote node 500 of the present disclosure. It should be understood that elements discussed with respect to FIG. 5A herein may be used in conjunction with, in combination with, or substituted for elements of any of the other Figure discussed herein and vice versa. In this illustrative example, a first hybrid data power cable 132 is coupled to one end of the pass-through bus 510, with a second hybrid data power cable 132 coupled to the other end of the pass-through bus 510. The intelligent remote node 500 includes a management circuit 402 which taps power from the pass-through bus 510. In this particular embodiment, upon successful completing the low voltage and high voltage startup procedures as described above, the management circuit 402 (described in FIG. 4) passes the high voltage signal to one or more power sourcing equipment (PSE) 520. In some embodiments, the PSE 520 are Power-over-Ethernet (PoE) or PoE Plus compliant PSE (i.e., IEEE 802.3af or 802.3at), providing an output voltage between 44 and 57 volts DC. The first hybrid data power cable 132 may further comprise one or more data carrying media 514, such as optical fiber in this example. One or more of the optical fiber 514 may be terminated within the intelligent remote node 500 at small form pluggable (SFP) modules 516 which comprise optical-electrical converters to provide connectivity and between the optical fibers and Ethernet electrical wires (e.g., twisted pair conductors). The power from the PSE 520 may then also be applied onto the Ethernet electrical wires by transformers 518 to provide hybrid data power connectivity at ports 522. Optical fiber from the first hybrid data power cable 132 not terminated within the intelligent remote node 500 may be spliced to optical fiber from of the second hybrid data power cable 132.

Figure 5B:
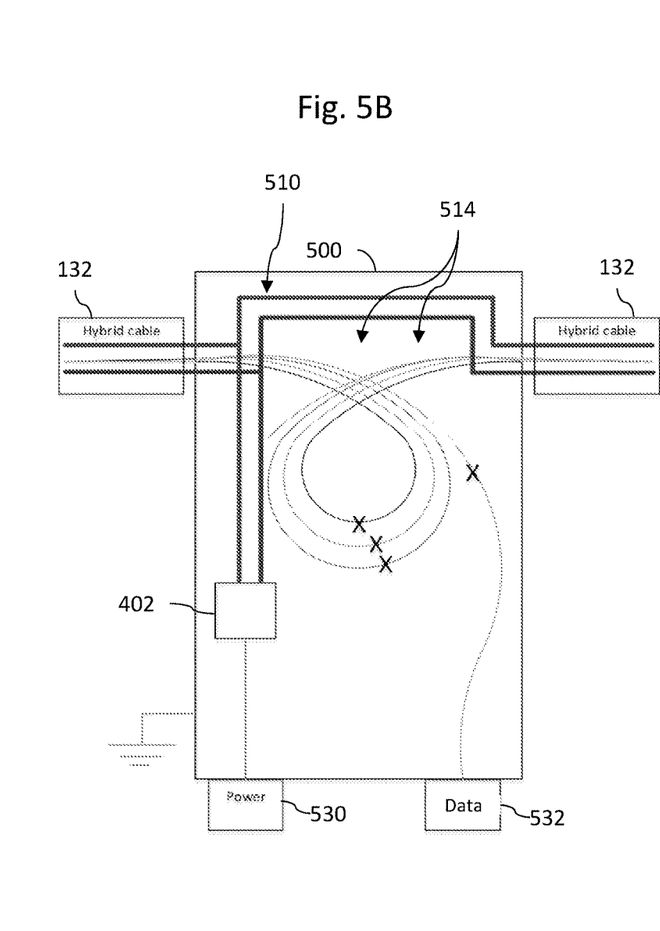

FIG. 5B is a diagram illustrating internal connections for one embodiment of another alternative intelligent remote node 550 of the present disclosure. It should be understood that elements discussed with respect to FIG. 5B herein may be used in conjunction with, in combination with, or substituted for elements of any of the other Figure discussed herein and vice versa. In this illustrative example, the first hybrid data power cable 132 is coupled to one end of the pass-through bus 510, with the second hybrid data power cable 132 coupled to the other end of the pass-through bus 510. The intelligent remote node 500 again includes the management circuit 402 which taps power from the pass-through bus 510. However, this embodiment provides for a broader range of applications, for example, application that may not be IEEE 802.3af or 802.3at compliant. In this particular embodiment, upon successful completing the low voltage and high voltage startup procedures as described above, the management circuit 402 passes a high voltage signal out from the intelligent remote node 550 at a power port 530 and one or more of the optical fiber 514 may be terminated within the intelligent remote node 550 at an optical fiber port 532 instead of being applied onto Ethernet twisted pair wiring.

It should be appreciated that in addition to the example embodiments described herein, other network and/or system architectures may be implemented that still functionally operate in the same manner as described in any of the embodiments disclosed herein. As the terms are used herein, neither the words "unit", "node", "module" nor any other phrase, are used herein as nonce words or nonce terms for the purpose of invoking 35 USC 112(f).

EXAMPLE EMBODIMENTS

Example 1 includes a high voltage distributing data access system, the system comprising: an intelligent power switch configured to couple to a power supply, wherein the intelligent power switch outputs a first differential voltage output; and a plurality of intelligent remote nodes each comprising a management microcontroller (MCU) and an DC-to-DC converter; wherein the plurality of intelligent remote nodes each receive the differential voltage output, and are communicatively coupled to a data network; wherein the intelligent power switch comprises a processor executing an intelligent start-up control and switching function and an electrical fault detection function; and wherein upon initialization, the intelligent start-up control and switching function configures the intelligent power switch to output the differential voltage output at a first voltage level while the electrical fault detection function monitors the differential voltage output; wherein based on results of monitoring of the differential voltage output at the first voltage level, the intelligent start-up control and switching function configures the intelligent power switch to switch the differential voltage output to a second voltage level higher than the first voltage level;

wherein while the intelligent power switch outputs the differential voltage output at the first voltage level, the MCU executes a low voltage startup procedure; wherein based on the results of the low voltage startup procedure, the MCU executes a high voltage startup procedure after the intelligent power switch switches output of the differential voltage output to the second voltage level; and wherein based on the results of the high voltage startup procedure, the MCU configures the DC-to-DC converter to output a second differential voltage output.

Example 2 includes the system of example 1, wherein the first differential voltage output and the second differential voltage output are each ground isolated outputs.

Example 3 includes the system of any of examples 1-2, wherein the data network comprises a telecommunications network.

Example 4 includes the system of any of examples 1-3, wherein the intelligent power switch is coupled to the plurality of intelligent remote nodes by at least a first pair of electrical conductors of a hybrid power data cable, and wherein the plurality of intelligent remote nodes are coupled to the data network by at least one data communication medium of the hybrid power data cable.

Example 5 includes the system of any of examples 1-4, wherein the at least one data communication medium comprises at least one of an electrical conductor or an optical fiber.

Example 6 includes the system of any of examples 1-5, wherein the intelligent power switch ramps the differential voltage output to the first voltage level.

Example 7 includes the system of any of examples 1-6, wherein the intelligent power switch ramps the differential voltage output from the first voltage level to the second voltage level.

Example 8 includes the system of any of examples 1-7, wherein the low voltage startup procedure comprises either a randomized delay or a sequence delay, initiated by receiving the first voltage output from the intelligent power switch.

Example 9 includes the system of any of examples 1-8, wherein the high voltage startup procedure comprises a randomized delay or a sequence delay, initiated by receiving the second voltage output from the intelligent power switch.

Example 10 includes the system of any of examples 1-9, wherein the electrical fault detection function monitors at least one of input voltage, output current, output differential voltage, high ohmic midpoint voltage and output voltage balance.

Example 11 includes the system of any of examples 1-10, wherein the electrical fault detection function detects faults including at least one of open circuits, short circuits, overcurrent, overvoltage, voltage imbalances, and earth faults.

Example 12 includes the system of any of examples 1-11, wherein the intelligent power switch comprises a first high voltage enable switch that controls application of a first polarity of the first differential voltage output to a first conductor coupled to the intelligent power switch, and a second high voltage enable switch that controls application of a second polarity of the first differential voltage output to a second conductor coupled to the intelligent power switch Example 13 includes the system of example 12, wherein the first high voltage enable switch and the second high voltage enable switch are controlled by the intelligent start-up control and switching function.

Example 14 includes the system of any of examples 1-13, wherein the intelligent start-up control and switching function monitors signature power surges that are characteristic of the intelligent remote nodes performing the low voltage startup procedure to determine when to switch the first differential voltage output from the first voltage level to the second voltage level.

Example 15 includes the system of any of examples 1-14, wherein the MCU is powered from the first differential voltage output during the low voltage startup procedure.

Example 16 includes the system of any of examples 1-15, wherein the MCU bootstraps power from an output of the DC-to-DC converter after an output of the DC-to-DC converter is enabled during the high voltage startup procedure.

Example 17 includes the system of any of examples 1-16, wherein one or more of the plurality of intelligent remote nodes include an Intermediate Bus Converter.

Example 18 includes the system of any of examples 1-17, wherein the intelligent power switch and the plurality of intelligent remote nodes form a network topology comprising at least one of a linear tap off network, a ring architecture, a tree network, or a combination of any thereof.

Example 19 includes the system of any of examples 1-18, further comprising at least one intelligent remote node configured to receive the differential voltage output that is not communicatively coupled to a data network.

Example 20 includes an intelligent power switch for a high voltage distributing data access system, the switch comprising: a processor executing an intelligent start-up control and switching function and an electrical fault detection function; wherein upon initialization, the intelligent start-up control and switching function configures the intelligent power switch to output the differential voltage output at a first voltage level while the electrical fault detection function monitors the differential voltage output; wherein based on results of monitoring of the differential voltage output at the first voltage level, the intelligent start-up control and switching function configures the intelligent power switch to switch the differential voltage output to a second voltage level higher than the first voltage level.

Example 21 includes the switch of example 20, wherein the intelligent start-up control and switching function monitors signature power surges that are characteristic one or more intelligent remote nodes performing a low voltage startup procedure to determine when to switch the first differential voltage output from the first voltage level to the second voltage level.

Example 22 includes the switch of any of examples 20-21, wherein the first differential voltage output is a ground isolated output.

Example 23 includes the switch of any of examples 20-22, wherein the intelligent power switch is configured to couple to one or more intelligent remote nodes by at least a first pair of electrical conductors of a hybrid power data cable, and wherein the one or more intelligent remote nodes are coupled to a data network by at least one data communication medium of the hybrid power data cable.

Example 24 includes the switch of any of examples 20-23, wherein the intelligent power switch ramps the differential voltage output to the first voltage level.

Example 25 includes the switch of any of examples 20-24, wherein the intelligent power switch ramps the differential voltage output from the first voltage level to the second voltage level.

Example 26 includes the switch of any of examples 20-25, wherein the electrical fault detection function monitors at least one of input voltage, output current, output differential voltage, high ohmic midpoint voltage and output voltage balance.

Example 27 includes the switch of any of examples 20-26, wherein the electrical fault detection function detects faults including at least one of open circuits, short circuits, overcurrent, overvoltage, voltage imbalances, and earth faults.

Example 28 includes the switch of any of examples 20-27, wherein the intelligent power switch is coupled to a plurality of intelligent remote nodes to form a network topology comprising at least one of a linear tap off network, a ring architecture, a tree network, or a combination of any thereof.

Example 29 includes an intelligent remote node for a high voltage distributing data access system, the node comprising: a pass-through power bus configured to receive a first differential voltage output from an intelligent power switch via a hybrid power data cable, wherein the intelligent remote node is communicatively coupled to a data network via the hybrid power data cable; a management microcontroller (MCU); and a DC-to-DC converter; wherein the MCU executes a low voltage startup procedure when the first differential voltage output is received from the intelligent power switch at a first voltage level; and wherein based on the results of the low voltage startup procedure, the MCU executes a high voltage startup procedure when the first differential voltage output is switched by the intelligent power switch to a second voltage level higher than the first voltage level; wherein based on the results of the high voltage startup procedure, the management microcontroller (MCU) configures the DC-to-DC converter to output a second differential voltage output; and wherein based on results of the high voltage startup procedure, the intelligent remote node selectively outputs power to at least one remote powered device.

Example 30 includes the intelligent remote node of example 29 further comprising at least one power sourcing equipment (PSE) circuit powered from the second differential voltage output, wherein the PSE circuit outputs power to the at least one remote powered device.

Example 31 includes the intelligent remote node of any of examples 29-30, wherein the MCU bootstraps power from an output of the DC-to-DC converter after an output of the DC-to-DC converter is enabled during the high voltage startup procedure.

Example 32 includes the intelligent remote node of any of examples 29-31, wherein the MCU is powered from the first differential voltage output during the low voltage startup procedure.

Example 33 includes the intelligent remote node of any of examples 29-32, wherein the pass-through power bus is configured to pass the first differential voltage output to a downstream intelligent remote node via a second hybrid power data cable; and wherein the downstream intelligent remote node is coupled to the data network by the second hybrid power data cable.

Example 34 includes the intelligent remote node of any of examples 29-33, wherein the low voltage startup procedure comprises a randomized delay or a sequence delay, initiated by receiving the first voltage output from the intelligent power switch.

Example 35 includes the intelligent remote node of any of examples 29-34, wherein the high voltage startup procedure comprises a randomized delay or a sequence delay, initiated by receiving the second voltage output from the intelligent power switch.

Example 36 includes the intelligent remote node of any of examples 29-35, wherein the low voltage startup procedure performs internal diagnostics including at least measurement of current tapped from the pass-through power bus.

Example 37 includes the intelligent remote node of any of examples 29-36, wherein the high voltage startup procedure comprise a plurality of stages in which different circuit segments of the intelligent remote node are energized and for which electrical parameters are measured.

Example 38 includes the intelligent remote node of any of examples 29-37, further comprising an Intermediate Bus Converter.

Example 39 includes the intelligent remote node of any of examples 29-38, wherein the intelligent power switch and the plurality of intelligent remote nodes form part of a network topology comprising at least one of a linear tap off network, a ring architecture, a tree network, or a combination of any thereof.

In various alternative embodiments, system and/or device elements, method steps, or example implementations described throughout this disclosure (such as any of the intelligent power switch, intelligent remote nodes, control, switching or fault detection functions, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As may be used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A high voltage distributing data access system, the system comprising:
   an intelligent power switch configured to couple to a power supply, wherein the intelligent power switch outputs a first differential voltage output; and
   a plurality of intelligent remote nodes each comprising a management microcontroller (MCU) and a DC-to-DC converter;
   wherein the plurality of intelligent remote nodes each receive the first differential voltage output, and are communicatively coupled to a data network;
   wherein the intelligent power switch comprises a processor executing an intelligent start-up control and switching function and an electrical fault detection function; and
   wherein upon initialization, the intelligent start-up control and switching function configures the intelligent power switch to output the first differential voltage output at a first voltage level while the electrical fault detection function monitors the first differential voltage output;
   wherein based on results of monitoring of the first differential voltage output at the first voltage level, the intelligent start-up control and switching function configures the intelligent power switch to switch the first differential voltage output to a second voltage level higher than the first voltage level;
   wherein while the intelligent power switch outputs the first differential voltage output at the first voltage level, the MCU executes a low voltage startup procedure;
   wherein based on the results of the low voltage startup procedure, the MCU executes a high voltage startup procedure after the intelligent power switch switches output of the first differential voltage output to the second voltage level; and
   wherein based on the results of the high voltage startup procedure, the MCU configures the DC-to-DC converter to output a second differential voltage output.

2. The system of claim 1, wherein the first differential voltage output and the second differential voltage output are each ground isolated outputs.

3. The system of claim 1, wherein the data network comprises a telecommunications network.

4. The system of claim 1, wherein the intelligent power switch is coupled to the plurality of intelligent remote nodes by at least a first pair of electrical conductors of a hybrid power data cable, and wherein the plurality of intelligent remote nodes are coupled to the data network by at least one data communication medium of the hybrid power data cable.

5. The system of claim 1, wherein the intelligent power switch ramps the first differential voltage output to the first voltage level.

6. The system of claim 1, wherein the intelligent power switch ramps the first differential voltage output from the first voltage level to the second voltage level.

7. The system of claim 1, wherein the low voltage startup procedure comprises either a randomized delay or a sequence delay, initiated by receiving the first differential voltage output at the first voltage level from the intelligent power switch.

8. The system of claim 1, wherein the high voltage startup procedure comprises a randomized delay or a sequence delay, initiated by receiving the first differential voltage output at the second voltage level from the intelligent power switch.

9. The system of claim 1, wherein the electrical fault detection function monitors at least one of input voltage, output current, output differential voltage, high ohmic midpoint voltage and output voltage balance.

10. The system of claim 1, wherein the electrical fault detection function detects faults including at least one of open circuits, short circuits, overcurrent, overvoltage, voltage imbalances, and earth faults.

11. The system of claim 1, wherein the intelligent power switch comprises a first high voltage enable switch that controls application of a first polarity of the first differential voltage output to a first conductor coupled to the intelligent power switch, and a second high voltage enable switch that controls application of a second polarity of the first differential voltage output to a second conductor coupled to the intelligent power switch.

12. The system of claim 1, wherein the intelligent start-up control and switching function monitors signature power surges that are characteristic of the plurality of intelligent remote nodes performing the low voltage startup procedure to determine when to switch the first differential voltage output from the first voltage level to the second voltage level.

13. The system of claim 1, wherein the MCU is powered from the first differential voltage output during the low voltage startup procedure.

14. The system of claim 1, wherein the MCU bootstraps power from an output of the DC-to-DC converter after an output of the DC-to-DC converter is enabled during the high voltage startup procedure.

15. The system of claim 1, wherein one or more of the plurality of intelligent remote nodes include an Intermediate Bus Converter.

16. The system of claim 1, wherein the intelligent power switch and the plurality of intelligent remote nodes form a network topology comprising at least one of a linear tap off network, a ring architecture, a tree network, or a combination of any thereof.

17. The system of claim 1, further comprising at least one intelligent remote node configured to receive the first differential voltage output that is not communicatively coupled to a data network.

18. The system of claim 4, wherein the at least one data communication medium comprises at least one of an electrical conductor or an optical fiber.

19. The system of claim 11, wherein the first high voltage enable switch and the second high voltage enable switch are controlled by the intelligent start-up control and switching function.

20. An intelligent power switch for a high voltage distributing data access system, the switch comprising:
   a processor executing an intelligent start-up control and switching function and an electrical fault detection function;
   wherein upon initialization, the intelligent start-up control and switching function configures the intelligent power switch to output a differential voltage output at a first voltage level while the electrical fault detection function monitors the differential voltage output;

wherein based on results of monitoring of the differential voltage output at the first voltage level, the intelligent start-up control and switching function configures the intelligent power switch to switch the differential voltage output to a second voltage level higher than the first voltage level, wherein the intelligent start-up control and switching function monitors signature power surges that are characteristic of one or more intelligent remote nodes performing a low voltage startup procedure to determine when to switch the differential voltage output from the first voltage level to the second voltage level.

21. The switch of claim 20, wherein the differential voltage output is a ground isolated output.

22. The switch of claim 20, wherein the intelligent power switch is configured to couple to one or more intelligent remote nodes by at least a first pair of electrical conductors of a hybrid power data cable, and wherein the one or more intelligent remote nodes are coupled to a data network by at least one data communication medium of the hybrid power data cable.

23. The switch of claim 20, wherein the intelligent power switch ramps the differential voltage output to the first voltage level.

24. The switch of claim 20, wherein the intelligent power switch ramps the differential voltage output from the first voltage level to the second voltage level.

25. The switch of claim 20, wherein the electrical fault detection function monitors at least one of input voltage, output current, output differential voltage, high ohmic midpoint voltage and output voltage balance.

26. The switch of claim 20, wherein the electrical fault detection function detects faults including at least one of open circuits, short circuits, overcurrent, overvoltage, voltage imbalances, and earth faults.

27. The switch of claim 20, wherein the intelligent power switch is coupled to a plurality of intelligent remote nodes to form a network topology comprising at least one of a linear tap off network, a ring architecture, a tree network, or a combination of any thereof.

28. An intelligent remote node for a high voltage distributing data access system, the intelligent remote node comprising:

a pass-through power bus configured to receive a first differential voltage output from an intelligent power switch via a hybrid power data cable, wherein the intelligent remote node is communicatively coupled to a data network via the hybrid power data cable;

a management microcontroller (MCU); and a DC-to-DC converter;

wherein the MCU executes a low voltage startup procedure when the first differential voltage output is received from the intelligent power switch at a first voltage level; and wherein based on results of the low voltage startup procedure, the MCU executes a high voltage startup procedure when the first differential voltage output is switched by the intelligent power switch to a second voltage level higher than the first voltage level;

wherein based on results of the high voltage startup procedure, the MCU configures the DC-to-DC converter to output a second differential voltage output; and wherein based on the results of the high voltage startup procedure, the intelligent remote node selectively outputs power to at least one remote powered device.

29. The intelligent remote node of claim 28, further comprising at least one power sourcing equipment (PSE) circuit powered from the second differential voltage output, wherein the at least one PSE circuit outputs power to the at least one remote powered device.

30. The intelligent remote node of claim 28, wherein the MCU bootstraps power from an output of the DC-to-DC converter after an output of the DC-to-DC converter is enabled during the high voltage startup procedure.

31. The intelligent remote node of claim 28, wherein the MCU is powered from the first differential voltage output during the low voltage startup procedure.

32. The intelligent remote node of claim 28, wherein the pass-through power bus is configured to pass the first differential voltage output to a downstream intelligent remote node via a second hybrid power data cable; and wherein the downstream intelligent remote node is coupled to the data network by the second hybrid power data cable.

33. The intelligent remote node of claim 28, wherein the low voltage startup procedure comprises a randomized delay or a sequence delay, initiated by receiving the first differential voltage output at the first voltage level from the intelligent power switch.

34. The intelligent remote node of claim 28, wherein the high voltage startup procedure comprises a randomized delay or a sequence delay, initiated by receiving the first differential voltage output at the second voltage level from the intelligent power switch.

35. The intelligent remote node of claim 28, wherein the low voltage startup procedure performs internal diagnostics including at least measurement of current tapped from the pass-through power bus.

36. The intelligent remote node of claim 28, wherein the high voltage startup procedure comprise a plurality of stages in which different circuit segments of the intelligent remote node are energized and for which electrical parameters are measured.

37. The intelligent remote node of claim 28, further comprising an Intermediate Bus Converter.

38. The intelligent remote node of claim 28, wherein the intelligent power switch and a plurality of intelligent remote nodes including the intelligent remote node form part of a network topology comprising at least one of a linear tap off network, a ring architecture, a tree network, or a combination of any thereof.

* * * * *